United States Patent
DuBois et al.

(10) Patent No.: US 7,366,613 B2
(45) Date of Patent: Apr. 29, 2008

(54) RF WIRELESS COMMUNICATION FOR DEEPLY EMBEDDED AEROSPACE SYSTEMS

(75) Inventors: Mark D. DuBois, Brandon, FL (US);
Karl H. Becker, Riverview, FL (US);
Charles F. Hayek, Seminole, FL (US);
Antony J. Kurth, Bradenton, FL (US);
Charles D. Chappell, Treasure Island, FL (US); Robert H. Fall, St. Petersburg, FL (US)

(73) Assignee: Honeywell International Inc., Morristown, NJ (US)

( * ) Notice: Subject to any disclaimer, the term of this patent is extended or adjusted under 35 U.S.C. 154(b) by 105 days.

(21) Appl. No.: 11/004,177

(22) Filed: Dec. 3, 2004

(65) Prior Publication Data
US 2006/0058960 A1    Mar. 16, 2006

Related U.S. Application Data

(60) Provisional application No. 60/608,819, filed on Sep. 10, 2004.

(51) Int. Cl.
*G01C 21/20* (2006.01)
(52) U.S. Cl. .................................... 701/220; 340/970
(58) Field of Classification Search ............... 701/220, 701/207; 244/164, 165; 340/970; 342/22, 342/38, 46, 63
See application file for complete search history.

(56) References Cited

U.S. PATENT DOCUMENTS

| 1,315,735 | A |  | 9/1919 | Michell |  |
|---|---|---|---|---|---|
| 2,363,260 | A |  | 11/1944 | Peskin |  |
| 2,710,234 | A |  | 6/1955 | Hansen |  |
| 2,959,060 | A |  | 11/1960 | Kunz |  |
| 2,999,391 | A |  | 9/1961 | Freebairn et al. |  |
| 3,039,316 | A |  | 6/1962 | Slater |  |
| 3,056,303 | A | * | 10/1962 | Naylor | 74/5.34 |

(Continued)

FOREIGN PATENT DOCUMENTS

GB          866473          4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Dalena Tran
(74) *Attorney, Agent, or Firm*—Fogg & Powers LLC

(57) ABSTRACT

A wireless communication interface for inertial measurement unit is disclosed. One or more instrumentation sensors, a processor, a wireless radio frequency transceiver with an antenna, and a power source are sealed within an inertial sensor assembly. The processor is adapted to receive output signals from the instrumentation sensors and to convert the output signals into a stream of digital data packets. A radio frequency transceiver is coupled to the processor and adapted to wirelessly communicate the stream of digital data packets through the antenna. In one embodiment, the radio frequency transceiver is further adapted to wirelessly receive a stream of digital data packets through the antenna and communicate the received digital data packets to the processor.

10 Claims, 12 Drawing Sheets

U.S. PATENT DOCUMENTS

| | | |
|---|---|---|
| 3,258,977 A | 7/1966 | Hoffman |
| 3,269,195 A | 8/1966 | Cahoon et al. |
| 3,328,595 A | 6/1967 | Tood, Jr. |
| 3,365,942 A * | 1/1968 | Blazek et al. ............. 73/178 R |
| 3,439,546 A | 4/1969 | Baker et al. |
| 3,572,856 A | 3/1971 | McHugh |
| 3,576,124 A | 4/1971 | O'Connor |
| 3,670,585 A | 6/1972 | Alexander et al. |
| 3,769,710 A | 11/1973 | Reister |
| 3,782,167 A | 1/1974 | Stuelpnagel |
| 3,938,256 A | 2/1976 | Crocker, Jr. |
| 4,003,265 A | 1/1977 | Craig et al. |
| 4,143,466 A | 3/1979 | Quermann |
| 4,150,579 A | 4/1979 | Vaughn |
| 4,214,482 A | 7/1980 | Bouchard |
| 4,244,215 A | 1/1981 | Merhav |
| 4,291,926 A | 9/1981 | Tomioka et al. |
| 4,413,864 A | 11/1983 | Phillips |
| 4,458,426 A | 7/1984 | O'Connor et al. |
| 4,488,041 A | 12/1984 | Baudot |
| 4,515,486 A | 5/1985 | Ide |
| 4,671,650 A | 6/1987 | Hirzel et al. |
| 4,711,125 A | 12/1987 | Morrison |
| 4,723,735 A * | 2/1988 | Eisenhaure et al. ......... 244/165 |
| 4,822,181 A | 4/1989 | Egli |
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,115,570 A | 5/1992 | Krogmann et al. |
| 5,319,577 A | 6/1994 | Lee |
| 5,357,437 A | 10/1994 | Polvani |
| 5,396,326 A | 3/1995 | Knobbe et al. |
| 5,410,232 A | 4/1995 | Lee |
| 5,710,559 A * | 1/1998 | Krogmann ................. 340/963 |
| 5,716,142 A | 2/1998 | Kristensen et al. |
| 5,743,654 A | 4/1998 | Ide et al. |
| 5,790,049 A * | 8/1998 | Harrell ................. 340/870.28 |
| 5,894,323 A | 4/1999 | Kain et al. |
| 6,145,393 A | 11/2000 | Canton |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,711,952 B2 * | 3/2004 | Leamy et al. ................. 73/579 |
| 6,741,209 B2 | 5/2004 | Lee |
| 6,786,084 B2 * | 9/2004 | Schroeder et al. ......... 73/117.3 |
| 6,802,221 B2 * | 10/2004 | Hedeen et al. ................ 73/587 |
| 6,826,478 B2 | 11/2004 | Riewe et al. |
| 6,918,186 B2 | 7/2005 | Ash et al. |
| 7,003,399 B1 | 2/2006 | Chappell |
| 7,066,653 B2 | 6/2006 | Dourlens et al. |
| 2002/0077189 A1 | 6/2002 | Tuer et al. |
| 2003/0120425 A1* | 6/2003 | Stanley et al. .............. 701/220 |
| 2004/0015323 A1 | 1/2004 | Boyton |
| 2004/0075737 A1 | 4/2004 | Kirby |
| 2004/0089083 A1 | 5/2004 | Bailey |
| 2004/0212803 A1 | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected MEMS-Based Sensors: Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

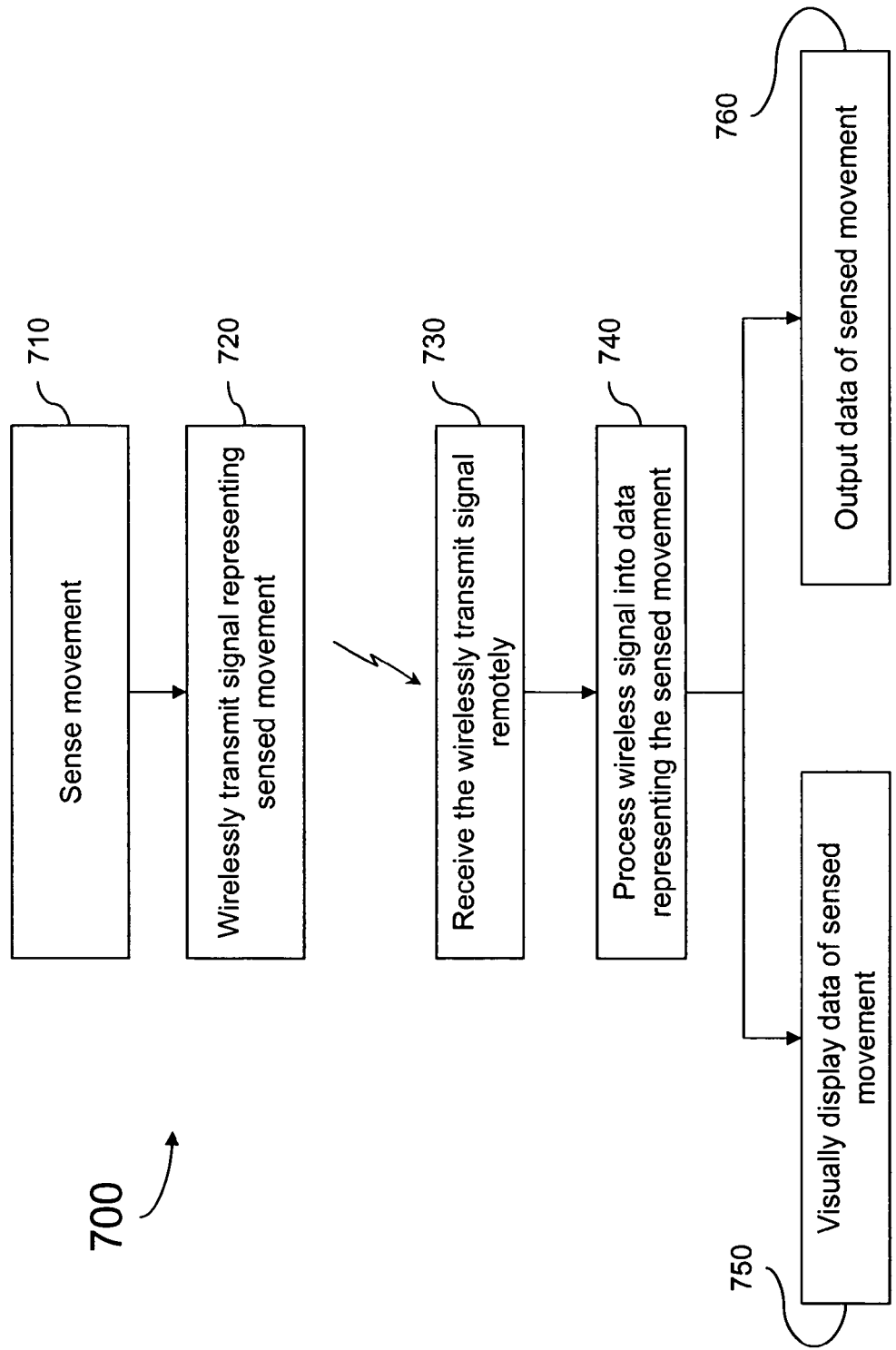

RF WIRELESS COMMUNICATION FOR DEEPLY EMBEDDED AEROSPACE SYSTEMS

CROSS REFERENCE TO RELATED APPLICATIONS

This application is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, which is incorporated herein by reference.

This application is related to co-pending United States patent application Honeywell Ser. No. 11/004,184 filed on even date herewith and entitled "GAS SUPPORTED INERTIAL SENSOR SYSTEM AND METHOD" (the '6540 Application). The '6540 Application is incorporated herein by reference.

This application is also related to the following applications filed on even date herewith, all of which are hereby incorporated herein by reference:

U.S. patent application Honeywell Ser. No. 11/004,759, entitled "ABSOLUTE POSITION DETERMINATION OF AN OBJECT USING PATTERN RECOGNITION," (the '7167 Application);

U.S. patent application Honeywell Ser. No. 11/004,743, entitled "RECISE, NO-CONTACT, POSITION SENSING USING IMAGING," (the '7057 Application);

U.S. patent application Honeywell Ser. No. 11/004,531, entitled "SPHERICAL POSITION MONITORING SYSTEM," (the '7169 Application);

U.S. patent application Honeywell Ser. No. 11/004,529, entitled "THREE DIMENSIONAL BALANCE ASSEMBLY," (the '7194 Application);

U.S. patent application Honeywell Ser. No. 11/004,452, entitled "ARTICULATED GAS BEARING SUPPORT PADS," (the '6475 Application);

U.S. patent application Honeywell Ser. No. 11/004,214, entitled "GAS JET CONTROL FOR INERTIAL MEASUREMENT UNIT," (the '6535 Application); and U.S. patent application Honeywell Ser. No. 11/004,517, entitled "GENERALIZED INERTIAL MEASUREMENT ERROR REDUCTION THROUGH MULTIPLE AXIS ROTATION DURING FLIGHT," (the '6368 Application).

TECHNICAL FIELD

The present invention generally relates to the field of positioning sensors and in particular to wireless communications for inertial reference systems.

BACKGROUND

Precision inertial navigation systems typically require concentric sets of ball bearing supported gimbals which allow instruments to freely rotate in flight maneuvers and allow them to be manipulated for calibration. The embodiments of the previously referenced application Ser. No. 11/004,184, which is herein incorporated by reference, eliminate the need for gimbals and ball bearings by supporting the inertial sensor assembly with a spherically shaped gas bearing. During the flight of a craft, the angular position of the inertial sensor assembly (sometimes also referred to as the attitude, or roll, pitch and yaw of the inertial sensor assembly) relative to the frame of the craft is monitored at all times. The gas bearing allows rotation of the inertial sensor assembly in all axes with no wear due to contact between rotating surfaces.

An inertial sensor assembly typically contains internally embedded instrumentation, such as accelerometers and gyroscopes that communicate data with other craft systems. In inertial navigation systems comprising ball bearing supported gimbals, data from instrumentation supported by the gimbals is typically communicated to other systems through moving contact devices, such as slip rings or twist caps, which provide a constant electrical channel for data without restricting the movement of the inertial sensor assembly. However, slip rings and twist caps, like ball bearing supported gimbals, are moving physical structures subject to wear and therefore represent a potential failure point for an inertial navigation system, or other system. Data signals communicated through slip rings also suffers from noise interference and low bandwidth. Further, communications through slip rings is not possible in applications, such as embodiments of the previously referenced application Ser. No. 11/004,184, where the gimbals are absent and no physical contact is desirable with the inertial sensor assembly.

For the reasons stated above and for other reasons stated below which will become apparent to those skilled in the art upon reading and understanding the specification, there is a need in the art for a contact free instrumentation data channel for communication with deeply embedded systems.

SUMMARY

The Embodiments of the present invention address the problem of communicating with sensors embedded within an object, when physical contact with the object is undesirable, through the use of a wireless communications channel, as well as other problems and will be understood by reading and studying the following specification.

In one embodiment, a wireless interface adapter for an inertial measurement unit is disclosed. A radio frequency transceiver is coupled with an inertial measurement unit having an input/output port. A second radio frequency transceiver is coupled with the input/output port of a controller. The controller is adapted to establish a wireless communication link with the inertial measurement unit and to receive the data output from the inertial measurement unit input/output port over the communication link.

In another embodiment, a communication link for an embedded inertial measurement unit is disclosed. A wireless interface adapter unit is coupled to the input/output port of an inertial measurement unit and a remote controller is adapted to wirelessly communicate with the inertial measurement unit.

In another embodiment, another communication link for an embedded inertial measurement unit is disclosed. A MIL-STD-1553B remote terminal wireless interface is coupled to a MIL-STD-1553B input/output port of an inertial measurement unit and adapted to communicate with the inertial measurement unit. A MIL-STD-1553B bus stub interface is coupled to a MIL-STD-1553B two channel communication bus and adapted to wirelessly communicate with the remote terminal wireless interface, and transfer data between the remote terminal wireless interface and the MIL-STD-1553B two channel communication bus.

In yet another embodiment, a wireless communication interface for a gas supported inertial sensor assembly is disclosed. One or more instrumentation sensors, a processor, a wireless radio frequency transceiver with an antenna, and a power source are sealed within a gas supported inertial sensor assembly. The processor is adapted to receive output signals from the instrumentation sensors and to convert the output signals into a stream of digital data packets. A radio frequency transceiver is coupled to the processor and adapted to wirelessly communicate the stream of digital data packets through the antenna In still another embodiment, a wireless data communication system is disclosed. A MIL-STD-1553B bus controller is adapted with a controller wireless interface. A plurality of MIL-STD-1553B remote terminal devices are each adapted with a remote terminal wireless interface. The plurality of MIL-STD-1553B remote terminal devices and the MIL-STD-1553B bus controller are adapted to wirelessly communicate with each other using the MIL-STD-1553 protocol.

In still another embodiment, a method for wirelessly communicating inertial measurements is disclosed. The method comprising sensing the movement of an inertial sensor assembly, wirelessly transmitting a signal representing the sensed movement, receiving the signal at a remote location; and processing the received signal into a data representative of the sensed movement.

In still another embodiment, another method for wirelessly communicating inertial measurements is disclosed. The method comprising sensing movement of a gas supported inertial sensor assembly from one or more instrumentation sensors sealed within the gas supported inertial sensor assembly. Transmitting a signal representing the sensed movement wirelessly. Receiving the signal at a location outside the gas supported inertial sensor assembly, and processing the signal into a data signal representing the sensed movement.

In still another embodiment, a method for wirelessly communicating balancing assembly adjustment instructions to an inertial sensor assembly is disclosed. The method comprising wirelessly transmitting a signal representing balancing assembly adjustment instructions, receiving the signal at an inertial sensor assembly, processing the signal into one or more electrical control signals, outputting the one or more electrical control signals to one or more balancing assembly electrical control devices, and adjusting the balancing assembly.

In still another embodiment, a method for wirelessly communicating heating element adjustment instructions to an inertial sensor assembly is disclosed. The method comprising wirelessly transmitting a signal representing heating element adjustment instructions, receiving the signal at an inertial sensor assembly, processing the signal into one or more electrical control signals, outputting the one or more electrical control signals to one or more heating element electrical control devices, and adjusting the heating element.

In yet another embodiment, a method for determining the movements of an inertial sensor assembly, where the method is embedded in a computer-readable medium, is disclosed. The method comprising receiving wirelessly transmitted data representing accelerations sensed by an inertial sensor assembly, receiving the signal remotely, and processing the signal into a data signal representing the sensed movement.

DRAWINGS

The present invention can be more easily understood and further advantages and uses thereof more readily apparent, when considered in view of the description of the preferred embodiments and the following figures in which:

FIG. 7 is a flow chart of a method embodiment of the present invention;

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

As stated above, embodiments of the commonly assigned application Ser. No. 11/004,184, which is herein incorporated by reference, eliminate the need for gimbals and ball bearings by supporting the inertial sensor assembly with a spherically shaped gas bearing. However, because the gas bearing eliminates physical reference points provided by the gimbals, and because physical contact with the freely rotating inertial sensor assembly is undesirable, the need arises to communicate with embedded instrumentation signals without creating external physical contacts with the inertial sensor assembly. The embodiments of the present invention address the problem of communicating with instrumentation embedded within an object by incorporating a wireless communications channel between the embedded sensors and external systems.

Figure 1A:
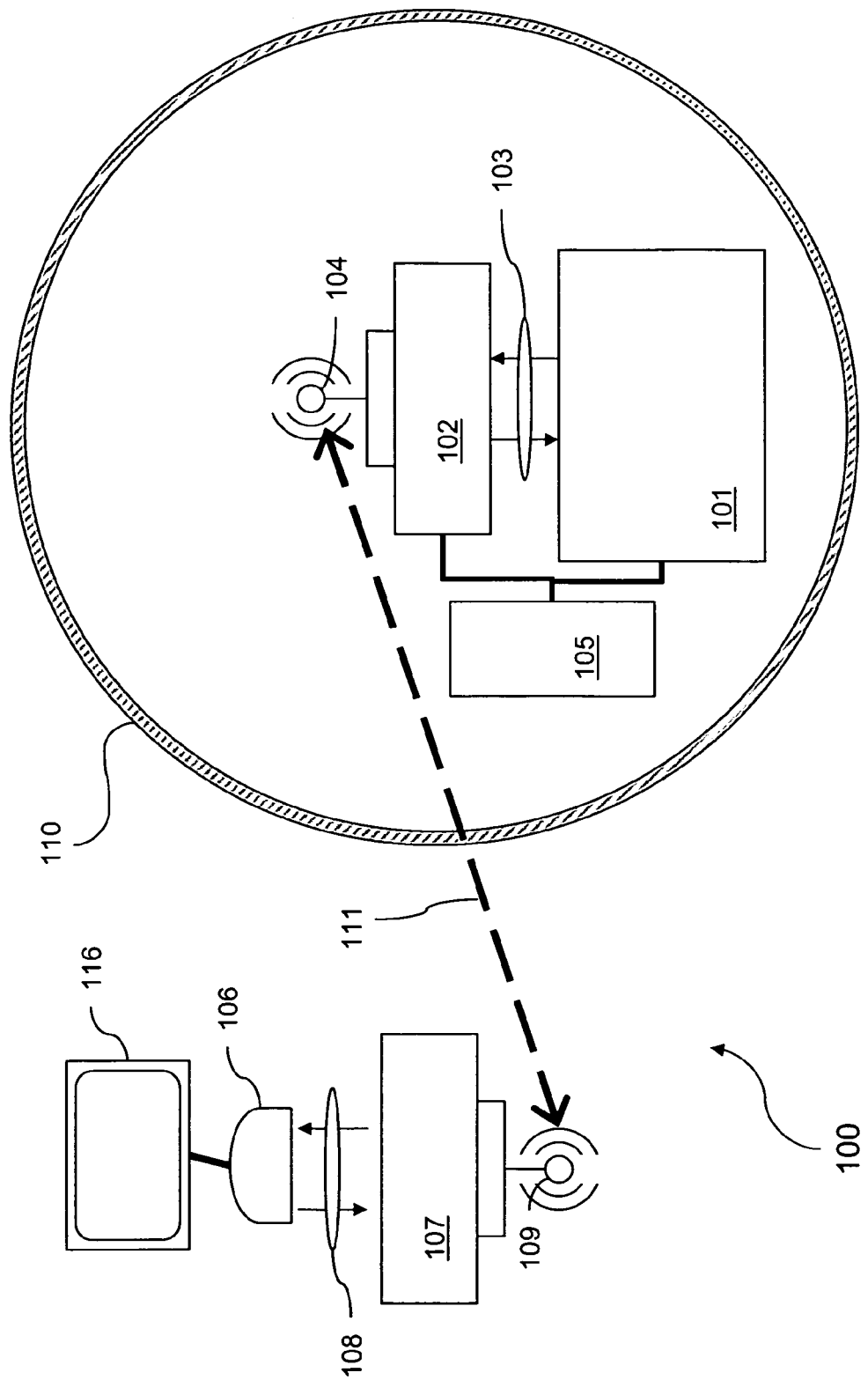
FIG. 1a is a diagram illustrating a wireless communication adapter for an inertial measurement unit of one embodiment of the present invention.
Figure 1B:
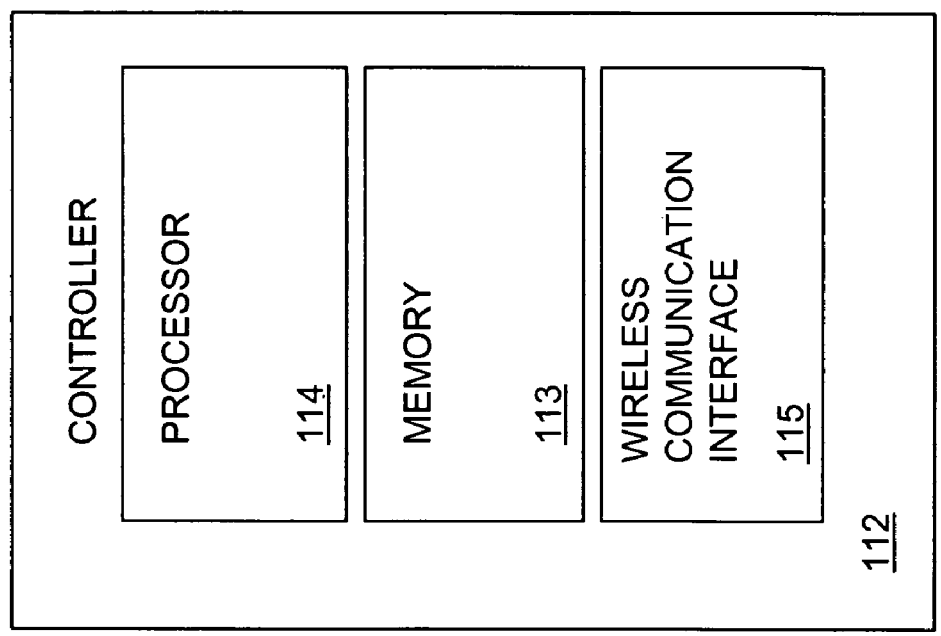
FIG. 1b is a diagram illustrating a remote computer system of an embodiment of the present invention.

In FIG. 1a, one embodiment 100 of the present invention is illustrated. In this embodiment, a commercially available inertial measurement unit (IMU) 101 is adapted with a 2.4 GHz Bluetooth transceiver 102 through an RS-232 interface 103. The Bluetooth transceiver 102 is adapted to transmit and receive data through a ceramic chip antenna 104. Both the IMU 101 and Bluetooth transceiver 102 are powered by a series of batteries 105. The IMU 101, Bluetooth transceiver 102, ceramic chip antenna 104 and batteries 105 are all mounted and enclosed with a sealed metal spherical ball 110. A remote computer 106 is adapted with a second 2.54 GHz Bluetooth transceiver module 107 through an RS-232 interface 108. The remote computer 106 is further adapted with a software program to establish a communication link 111 between the embedded Bluetooth transceiver 102 and the second Bluetooth transceiver 107, receive angular rate and gravitational vector data from the IMU 101, and display in a visual format, the angular rate and gravitational vector data from the IMU 101 on a display 116. As the sealed metal spherical ball 110 is moved, the embedded IMU 101 senses the angular rotations and accelerations and communicates the data through the RS-232 interface 103 to the Bluetooth transceiver 102. The Bluetooth transceiver 102 transmits digital data to the remote computer 106, which in turn graphically displays in vector form the current angular and gravitational forces acting upon the ball 110. Although this specification illustrates the use of a remote computer system as a controller, as illustrated in FIG. 1b, any type of controller 112 having a memory 113, a processor 114, and a wireless communication interface 115, that is adapted to wirelessly communicate instrumentation and control data signals to instrumentation embedded within an object, can be used as a remote system and may be referred to in this specification as a controller, a remote controller, a remote computer, or a remote computer system.

Figure 2:
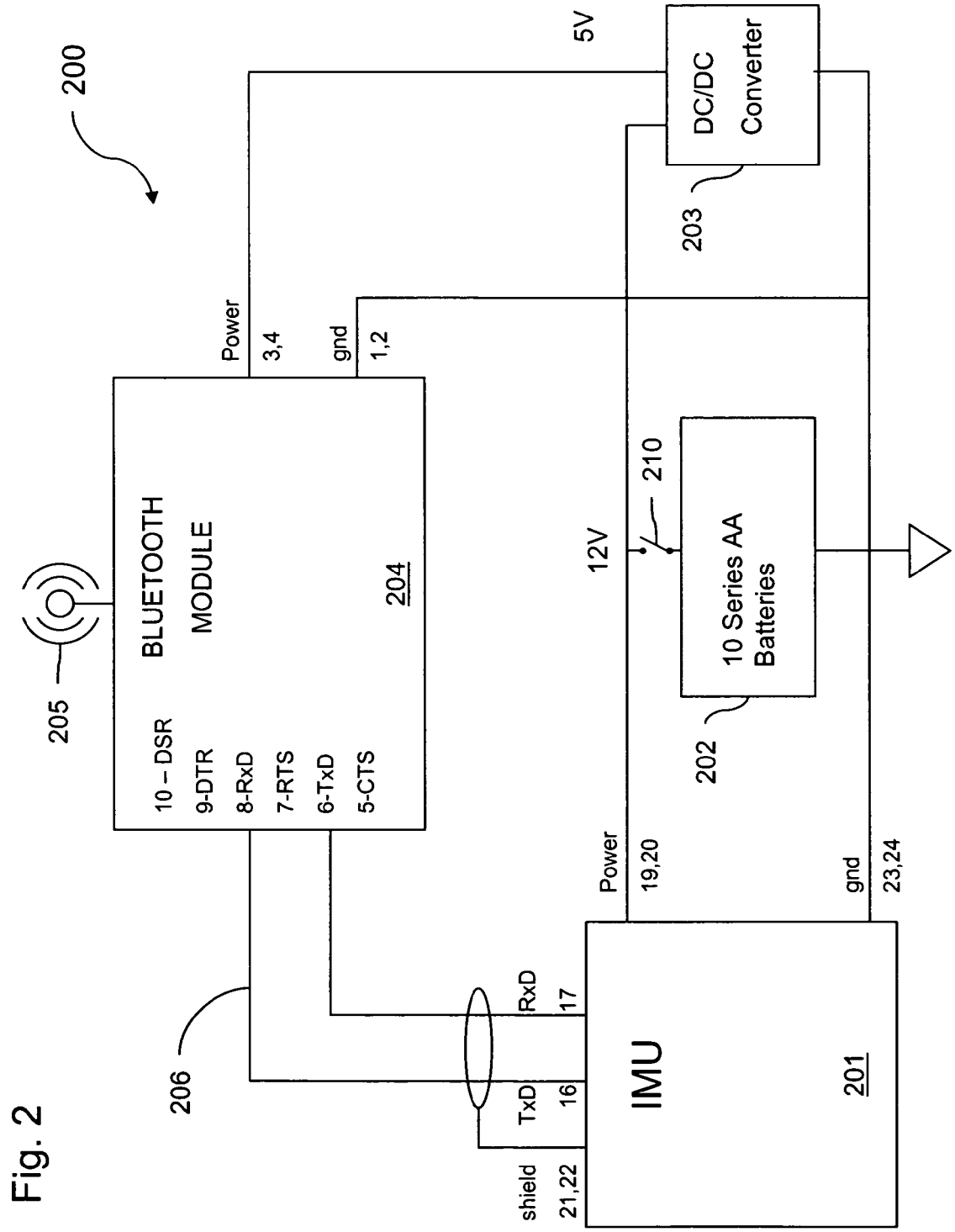
FIG. 2 is a diagram illustrating a wireless communication circuit for an embedded inertial measurement unit of an embodiment of the present invention.

In FIG. 2, a schematic of one embodiment 200 of a wireless communication circuit for an embedded IMU is illustrated. The wireless communication circuit of FIG. 2 comprises an IMU 201, a 12 volt battery source 202 (or, battery 202), a DC/DC converter 203, and a Bluetooth module 204 adapted with a ceramic chip antenna 205. A nominal 12 volts power is applied from a battery 202 to the IMU 201. The battery 202 is also connected to the DC/DC converter 203 which supplies a predetermined constant voltage to the Bluetooth module 204. In some embodiments, the battery may be connected to the IMU 201 and DC/DC converter 203, through a switch 210 to allow the circuit to be powered on or off. A bus line 206 connects input/output data ports of the IMU 201 and the Bluetooth module 204. Serial output signals from the IMU 201 are received by the Bluetooth module 204 which transmits the data to a remote computer adapted to receive Bluetooth wireless data.

In other embodiments, the IMU can be adapted with a 2.4 GHz Bluetooth transceiver module through an RS-422 interface, and/or a MIL-STD-1553B interface. Examples of IMU's that communicate via RS-422 interfaces are the Honeywell HG1900 MEMS IMU and the Honeywell Miniature Inertial Measurement Unit (MIMU). The MIMU additionally contains a MIL-STD-1553B interface. In other embodiments, the communication link between the remote computer and the IMU provided by the 2.4 GHz Bluetooth transceivers, can instead be established by another communication standard or protocol, such as, but not limited to, the IEEE 802.11 standards. Besides angular data, other embodiments of the current invention can communicate operating and health status data between the embedded instrumentation and remote system, or any other data the IMU is designed to output.

Figure 3:
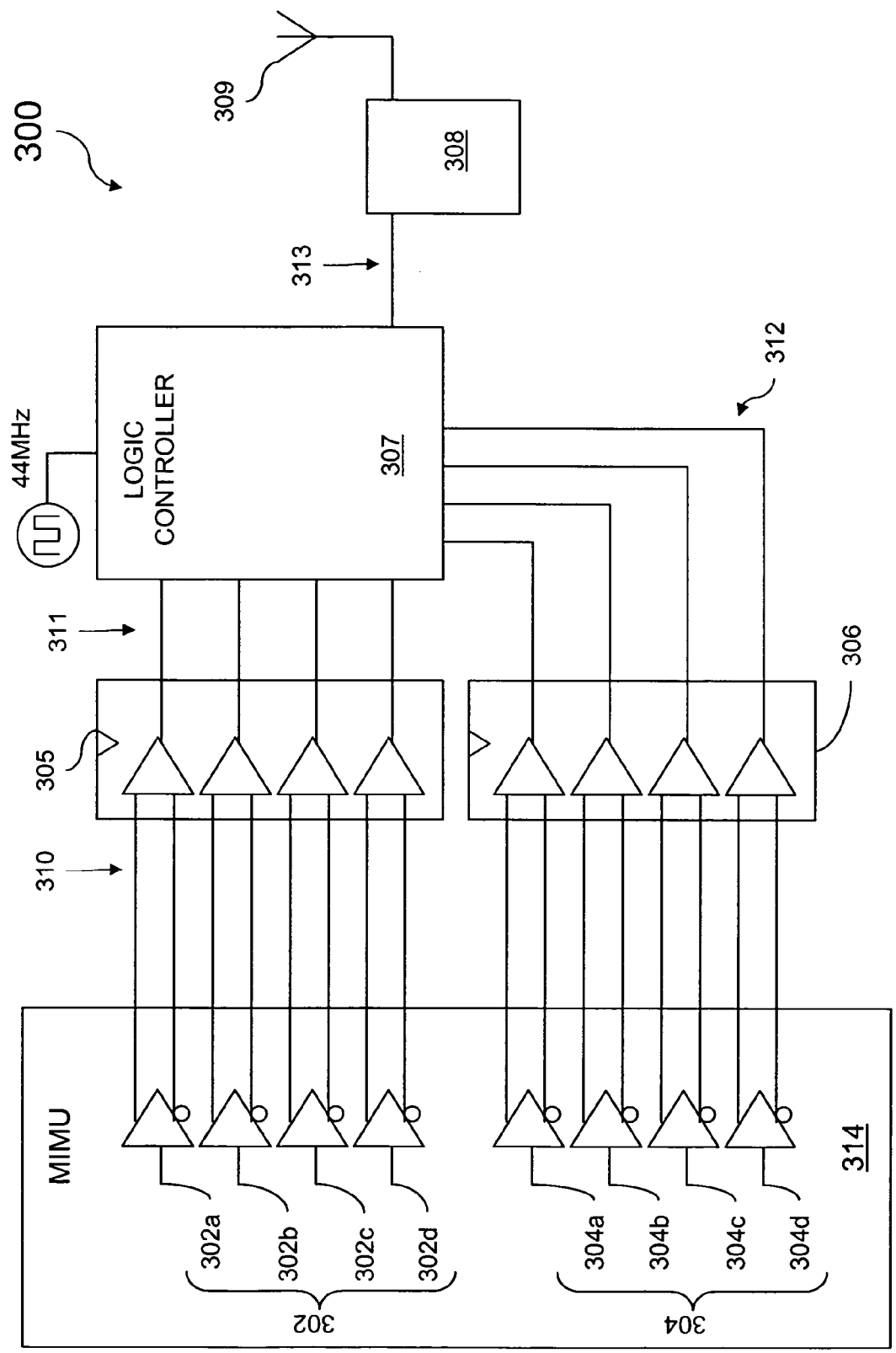
FIG. 3 is another diagram illustrating a wireless communication circuit for an embedded inertial measurement unit of an embodiment of the present invention.

In FIG. 3, a schematic of one embodiment of a wireless communication interface 300 in combination with an embedded MIMU is illustrated. An RS-422 interface of a MIMU 314 is designed to output flight data, and data on the operating and health status of the MIMU. The output flight data consists of two redundant sets of four RS-422 compatible serial data streams, 302 and 304, each comprised of a 1 MHz clock 302a and 304a, a 200 Hz system sync 302b and 304b, a 200 Hz frame sync, 302c and 304c, and a 1 Mbit/s serial data stream 302d and 304d. Although the MIMU utilizes a 1 MHz clock, it is envisioned that the present embodiment can be adapted for other clock speeds. For each stream, the MIMU RS-422 interface 314 outputs a differential voltage signal to a balanced interface connection 310. The wireless communication interface 300 comprises a set of RS-422 data stream receivers 305 and 306, each having differential amplifiers with single ended outputs, a 44 MHz logic controller 307, and a spread spectrum wireless transceiver with antenna 308 and 309. The data stream receivers 305 and 306 convert the differential signals from the balanced interface connection 310 into two sets of single ended signals 311 and 312, for input into a logic controller 307. The logic controller 307 processes the two sets of single ended signals 311 and 312, into a single output of a 44 MHz serial data stream 313 which is wirelessly transmitted by the spread spectrum wireless transceiver 308 through the antenna 309. To receive the transmitted data, a remote computer system (not illustrated) would comprise a remote spread spectrum wireless transceiver compatible with the spread spectrum wireless transceiver 308, and a controller adapted to extract the flight and status data from the transmitted serial data stream.

Figure 4A:
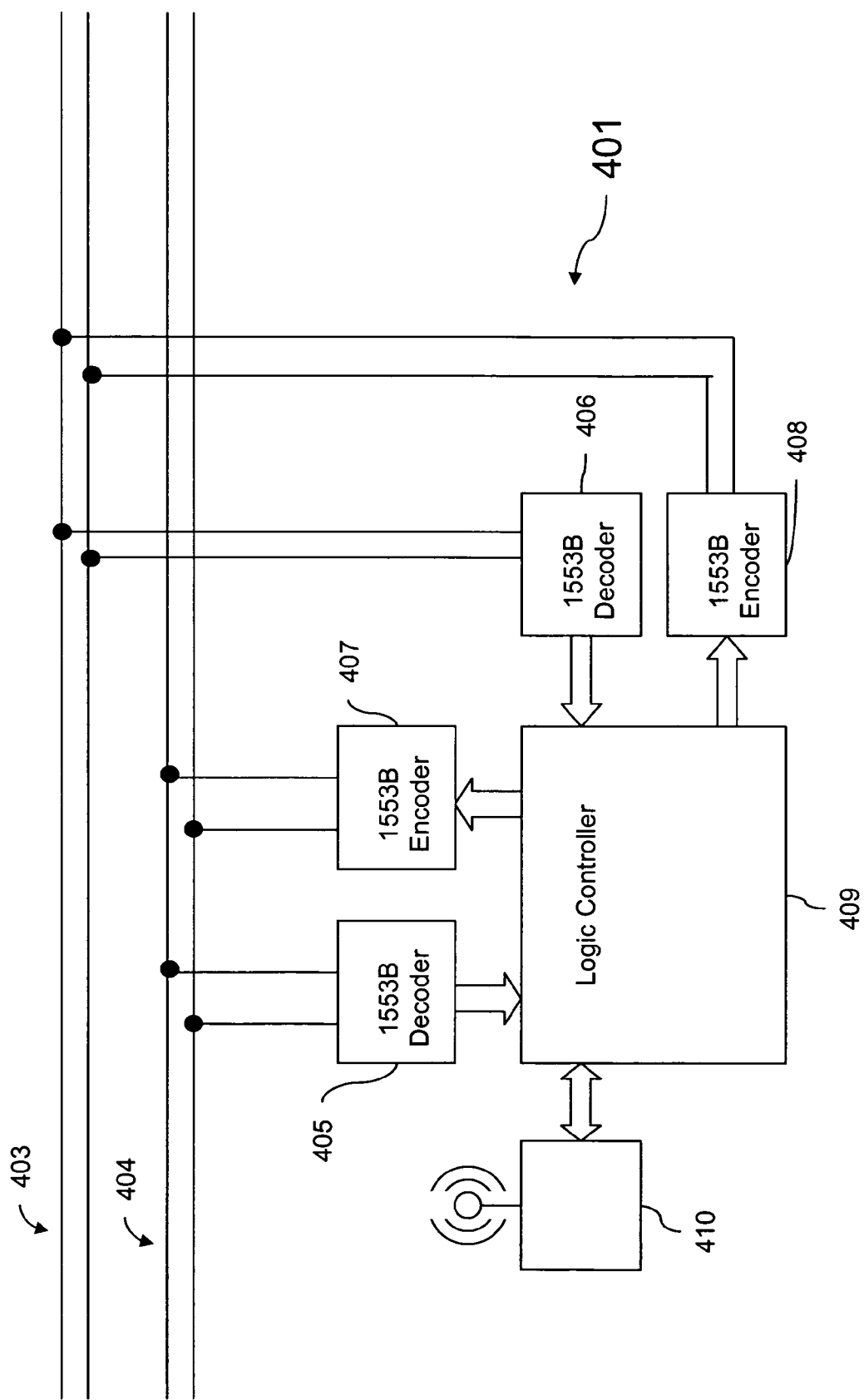
FIGS. 4a and 4b are diagrams illustrating a wireless MIL-STD-1553B communication interface for an embedded inertial measurement unit of an embodiment of the present invention.
Figure 4B:
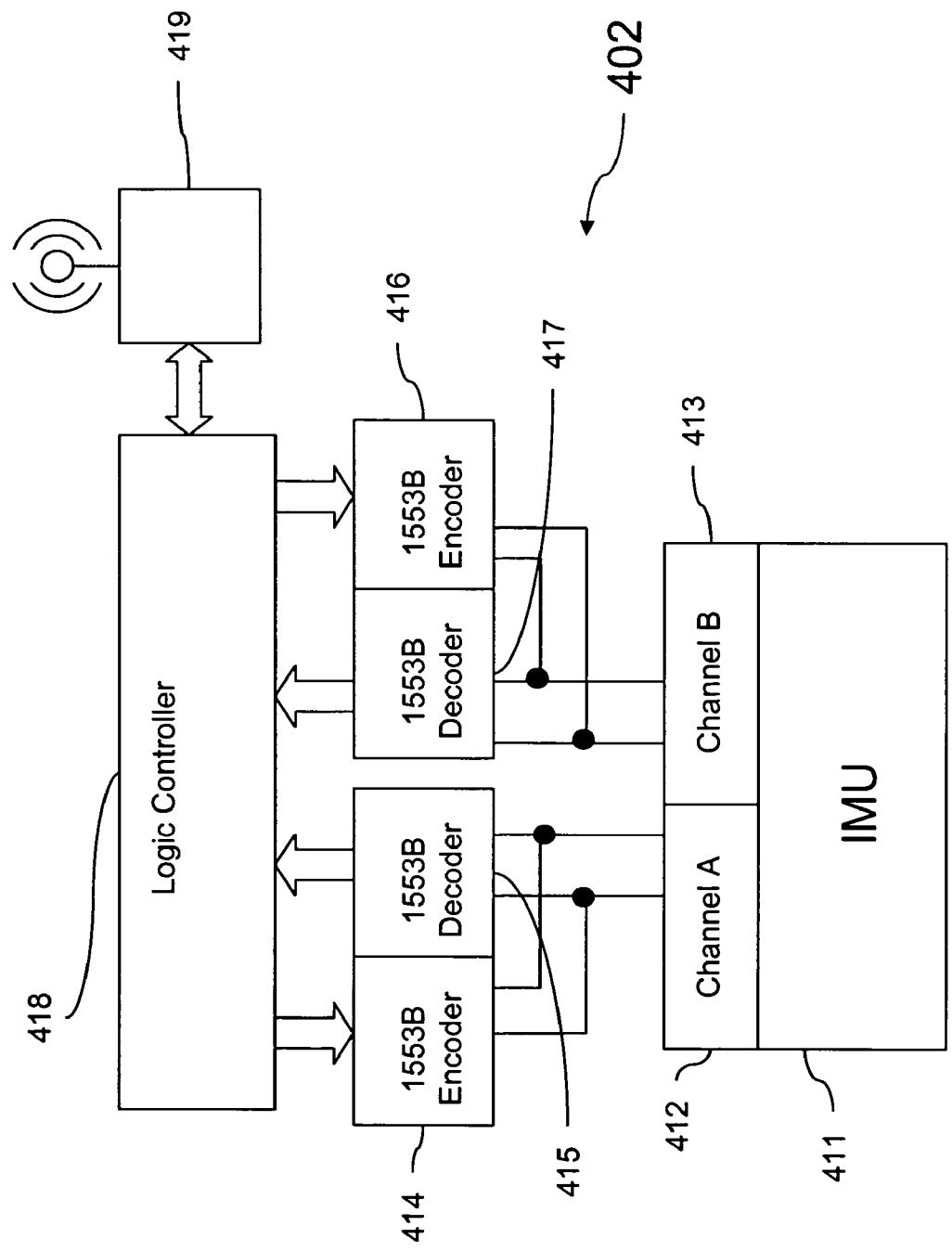

In FIGS. 4a and 4b, an embodiment of a wireless communication interface in combination with an embedded MIMU Mil-Std-1553B (1553B) interface is illustrated. A 1553B interface on a MIMU is designed to output flight navigation data, and data on the operating and health status of the MIMU. The interface also operates as a remote terminal as defined by the Mil-Std-1553B standard. A 1553B interface consists of a channel A and channel B, each transmitting and receiving identical data on an associated channel A data bus 403 and channel B data bus 404. Under the standard, a single bus controller (not shown) initiates all message communications over the two data busses by sending a command to one of several remote terminals connect to the busses. The selected remote terminal may then communicate data over the busses back to the bus controller, or directly to another remote terminal. The present embodiment comprises a MIMU combined with a wireless interface 402 and a 1553B data bus stub combined with a wireless interface 401. To send data, the MIMU 1553B interface 411 outputs identical data signals to the redundant A channel 412 and B channel 413 outputs. A channel and B channel 1553B decoders, 415 and 417 extract the data from the data signals and logic controller 418 processes the two sets of extracted data into a single output data stream. The single output data stream is wirelessly transmitted by the spread spectrum wireless transceiver and antenna 419. The 1553B data bus stub wireless interface 401 spread spectrum wireless transceiver and antenna 410 receives the wireless data and converts it into a single data stream which is separated by a logic controller 409 back into independent A channel and B channel data streams. The A channel and B Channel data streams are re-encoded into the 1553B protocol by the 1553B encoders, 407 and 408, and placed on the associated channel A and channel B data busses, 403 and 404. To receive data, the 1553B data bus stub wireless interface 401 inputs data signals from the data busses, 403 and 404, through A channel and B channel 1553B decoders, 405 and 406. A channel and B channel 1553B decoders, 405 and 406 extract the data from the data signals and logic controller 409 processes the two sets of extracted data into a single output data stream. The single output data stream is wirelessly transmitted by the spread spectrum wireless transceiver and antenna 410. The MIMU wireless interface 402 spread spectrum wireless transceiver and antenna 419 receives the wireless data and converts it into a single data stream which is separated by a logic controller 418 back into independent A channel and B channel data streams, re-encoded into the 1553B protocol by the 1553B encoders, 414 and 416, and received at the associated A channel and B channel MIMU 1553B interfaces 412 and 413.

In other embodiments, some or all of the protocol encoding and decoding performed by 1553B encoders 414 and 416, and 1553B decoders 415 and 417, are performed by logic controller 418. In still other embodiments, some or all of the protocol encoding and decoding performed by 1553B encoders 407 and 408, and 1553B decoders 405 and 406, are performed by logic controller 409.

Figure 5:
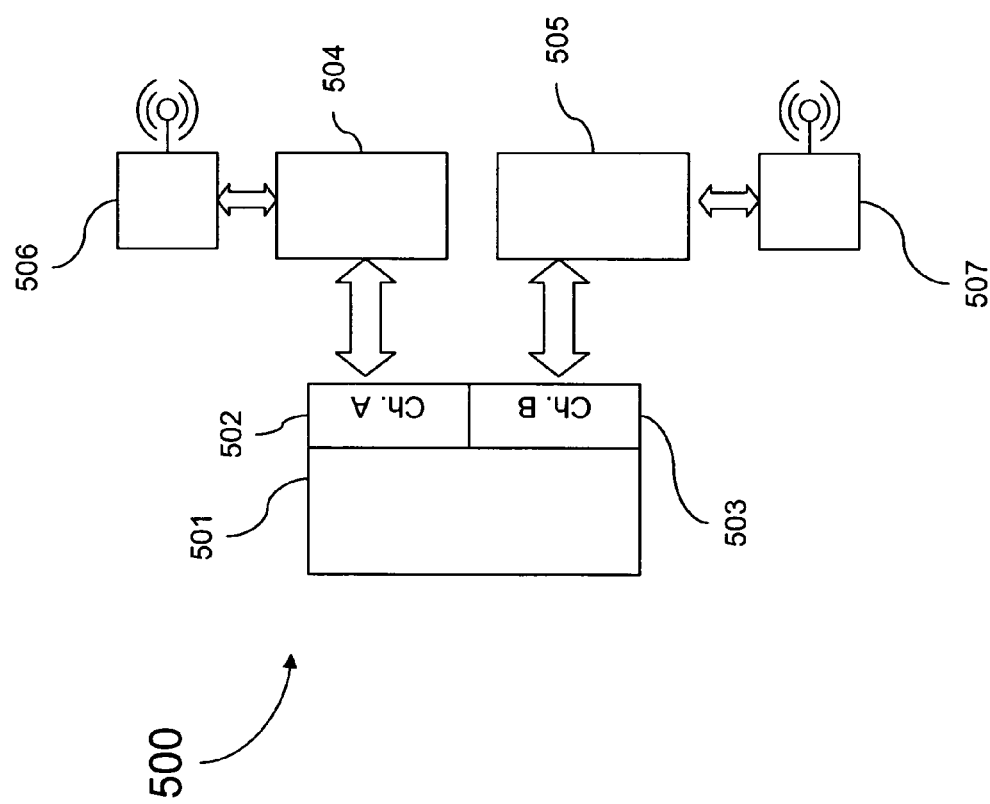
FIG. 5 is a diagram illustrating a wireless adapter for a MIL-STD-1553B device of an embodiment of the present invention.

In FIG. 5, another embodiment of a wireless communication interface in combination with an embedded MIMU 1553B interface of the present invention is illustrated. In this embodiment, the A channel and B channel 1553B busses are replaced with one or more wireless communication links. In one embodiment 500, the interface port of a standard 1553B device 501 is adapted with a wireless interface comprising A and B channel logic controllers 504 and 505, and A and B channel spread spectrum wireless transceivers and antennas 506 and 507. When sending data, the 1553B device 501 outputs identical A channel 502 and B channel 503 data signals to A channel and B channel logic controllers 504 and 505. Logic controllers 504 and 505 each decode the data from the associated 1553B data signals into output data streams which are wirelessly transmitted by an A channel spread spectrum wireless transceiver and antenna 506 and a B channel spread spectrum wireless transceiver and antenna 507. Conversely, when data is received from the wireless channels, the A and B channel spread spectrum wireless transceivers 506 and 507 each output a data stream to the associated logic controllers 504 and 505, which encode the data streams into the 1553B protocol and then output the data streams to the A channel and B channel interfaces, 502 and 503 of the 1553B device 501. The standard 1553B device 501 can be a bus controller in one embodiment, or in other embodiments an IMU, a remote computer system, or any other device designed to operate as a 1553B remote terminal.

Previously discussed embodiments of the present invention have disclosed embodiments which enable an IMU to communicate data wirelessly by adapting an IMU's physical I/O port with a wireless interface. In other embodiments, a wireless communication link can also be integrated into devices and adapted to transmit instrumentation and control data between remote computer systems and components embedded within an enclosed system, or to enable a remote computer to query on the status or position of embedded components.

Figure 6A:
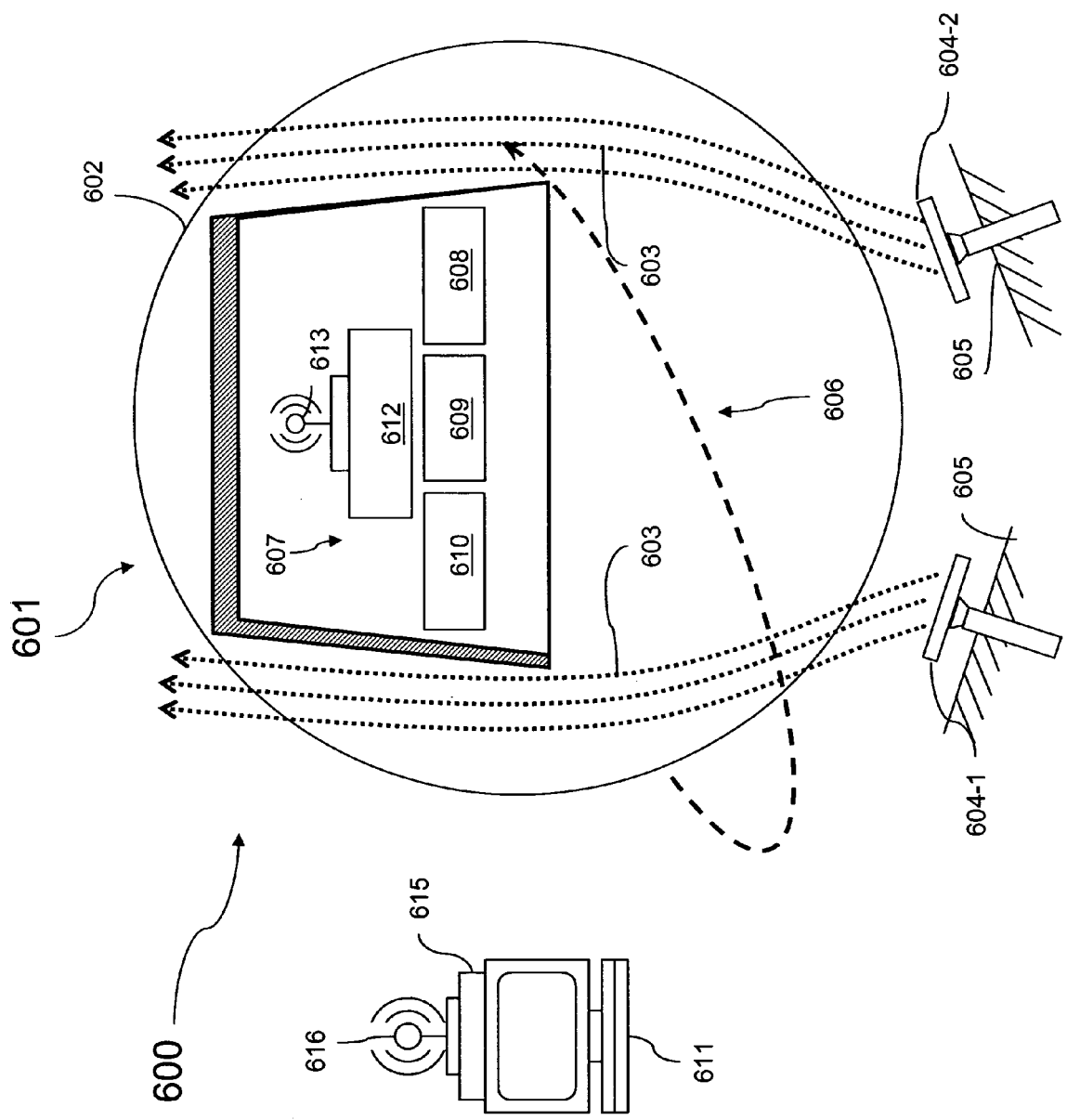
FIGS. 6a and 6b are diagrams illustrating a wireless communication link for components embedded within a gas bearing supported inertial sensor assembly of an embodiment of the present invention.
Figure 6B:
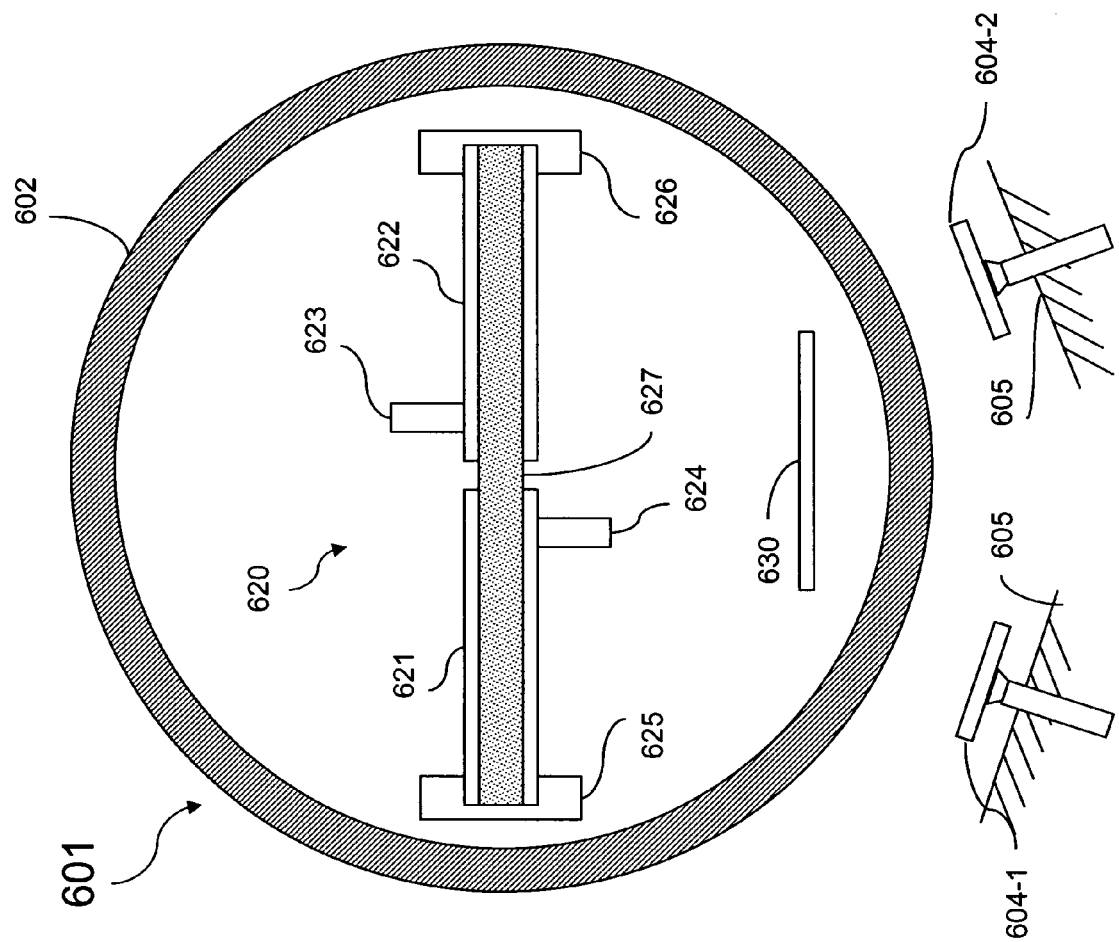

In FIGS. 6a and 6b, a wireless communication channel in combination with a Gas Supported Inertial Sensor Assembly, of one embodiment of the present invention is illustrated. A gas supported inertial navigation system (INS) 601 utilizes a freely rotating spherically shaped inertial sensor assembly (ISA) 602. The ISA is supported, or floats, within a spherically shaped gas bearing 603 generated by a plurality of gas pads 604-1 and 604-2 which are attached to, and penetrate, an outer shell assembly 605. (Although only two gas pads are shown in FIG. 6, it will be understood in the art that more than two gas pads can be used to achieve the desired result). Pressurized gas is applied to the gas pads 604-1 and 604-2 and the supported ISA 602 rides on a cushion of gas with little or no contact between the ISA and the gas pads. The frictionless gas bearing 603 (i.e. flow of gas 603) allows the ISA 602 to rotate on all axes. Reference number 606 generally illustrates an example of a rotational motion of the sphere 602. Additional details regarding the gas bearing 603, gas pads 604, the INS 601, and the ISA 602 are found in the application Ser. No. 11/004,184 herein incorporated by reference. Within the ISA 602 are embedded components 607 including instrumentation sensors 608, processing systems 609 and control devices 610 each of which may require the communication of data with one or more external remote systems 611 to perform at least part of their respective functions.

In some embodiments, the instrumentation sensors 608 may include, but are not limited to, one or more accelerometers adapted to output signals describing the accelerations along one or more axes produced by, and acting on the craft. In some embodiments, the instrumentation sensors 608 may include, but are not limited to one or more gyroscopes, angular accelerometers, velocity meters or other inertial sensors. In some embodiments, instrumentation sensors 608 may also output vibration frequencies, or environmental data such as temperatures or pressure.

In some embodiments, the processing systems 609 may communicate data with remote systems 611. Such data can include, but is not limited to, data collected from the outputs of instrumentation sensors, processing system status or results, system health indicators and/or trouble alarms (e.g. battery power level, component failure indications), or programming or control instructions for embedded components.

In other embodiments, the control devices 610 may include, but are not limited to, one or more balancing assemblies as described in the commonly assigned application Ser. No. 11/004,529, incorporated herein by reference. The balancing assemblies, comprised of one or more eccentric weighted shafts, are located within the ISA 602 and are rotated in order to adjust the center of gravity of the ISA 602. In some embodiments, electrically controlled servos and actuators adjust shaft rotations and weight positions, and may lock balancing assembly components into position. Additional instrumentation sensors 608 may output data on the position of balancing assembly shafts and weights, or the status of whether balancing assembly components are locked into position. In another embodiment, the control devices 610 may include, but are not limited to, one or more heating elements located within the ISA 602.

Embodiments of the present invention establish one or more wireless communication channels between one or more of the embedded components 607, and remote systems 611 via one or more embedded wireless RF transceivers 612 and antennas 613, which are also located within the ISA 602. In order to utilize the capabilities of wireless protocols, data from analog sensors must first be transformed into a digital format, and data from all embedded components 607 must be placed into a data packet format, prior to transmission. The process of transforming analog and digital data signal into data packets for transmission is a process that one skilled in the art would readily understand and is not further discussed in this application. To communicate with the embedded components 607, the remote systems 611 are also adapted with one or more wireless RF transceivers 615 and antennas 616. In one embodiment, each embedded component 607 may be adapted to create its own wireless communication channel through a dedicated wireless transceiver. However, in a preferred embodiment, one or more embedded components 607 are configured to communicate with the remote systems via a shared wireless transceiver 612. Any of the embedded components 607 may initiate data communications with remote systems based on preprogrammed criteria, or respond to queries by the remote systems.

In one embodiment, the instrumentation sensors 608 comprise one or more inertial sensors and balancing assembly configuration sensors. A processor 609 (or processing system 609) is adapted to convert inertial sensor and balancing assembly configuration sensor output into a data packet format for wireless transmission to a remote system 611. In some embodiments, processor 609 may also be adapted to convert the output of additional instrumentation sensors 608, such as temperatures or pressure data, into data packets for wireless transmission. In some embodiments, processor 609 may be further adapted with a memory to store data received from instrumentation sensors 608 for later wireless transmission. The later wireless transmission can be initiated by a query received from the remote system 611 or triggered by a predetermined event. In still other embodiment, processor 609 may be adapted to analyze or process the data from instrumentation sensor 608. For example, processing system 609 may receive data (e.g. vibration frequency data) from the output of an instrumentation sensor 608 that is outside a predetermined acceptance criteria. Through the wireless transceiver, the processor system 609 can be adapted to transmit a system trouble flag to a remote system 611.

In another embodiment, the control devices 610 comprise one or more electrically controlled servos and actuators which adjust the configuration of a balancing assembly 620 as illustrated in FIG. 6*b*. In this embodiment, processor 609 is adapted to output electrical control signals to control devices 610 to rotate balance assembly shafts 621 and 622 around a center shaft 627, realign the positions of balancing weights 623 and 624, and lock and unlock balancing assembly 620 components into position. A detailed description of the balancing assembly components for an ISA is available in the commonly assigned application Ser. No. 11/004,529, incorporated herein by reference. In one embodiment, to adjust the ISA balancing system, the remote system 611 wirelessly transmits one or more packets of control device instruction data which is received by an embedded wireless RF transceiver 612 and antenna 613. The transceiver 612 outputs the control device instructions to the processor 609 which implements the instructions by outputting electrical control signals to the control devices 610 specified by the remote computer 611. For example, in accordance with the control data received from the remote terminal 611, processor 609 may output electrical control signals instructing control device servos 625 and 626 of the balancing assembly to disengage position locks, adjust shafts and weights to desired positions, and then re-lock the balancing assembly into position.

In another embodiment, the control devices 610 comprise one or more electrically controlled heating elements 630. In one embodiment, heating elements 630 bring one or more embedded components 607 to operating temperature. In one embodiment, heating elements 630 maintain one or more embedded components 607 at operating temperature. In one embodiment, processor 609 is adapted to output electrical control signals to one or more heating elements 630. In one embodiment, processor 609 is adapted to turn one or more heating elements 630 on or off. In one embodiment, processor 609 is adapted to control the amount of heat produced by one or more heating elements 630.

In another embodiment, the remote system 611 may wirelessly transmits programming instructions to the processing system 609 to reprogram processing system functions or change set points. The processor 609 may be further adapted to wirelessly communicate the operating health of one or more embedded components 607, or the results of self-diagnostic checks to the remote system 611.

In FIG. 7, a method for wirelessly communicating inertial measurements 700 of an embodiment of the present invention is illustrated. The method starts by sensing movement of an inertial sensor assembly (710). In one embodiment, movement of a gas supported inertial assembly is sensed. A signal representing the sensed movement is then transmitted wirelessly (720). The wireless signal is then received remotely (730). The signal is then processed into a data signal representing the sensed movement (740). In one embodiment, the data signal representing the sensed movement is visually displayed (750). In one embodiment, data signal representing the sensed movement is outputted (760) to another system such as a flight control system.

Figure 8:
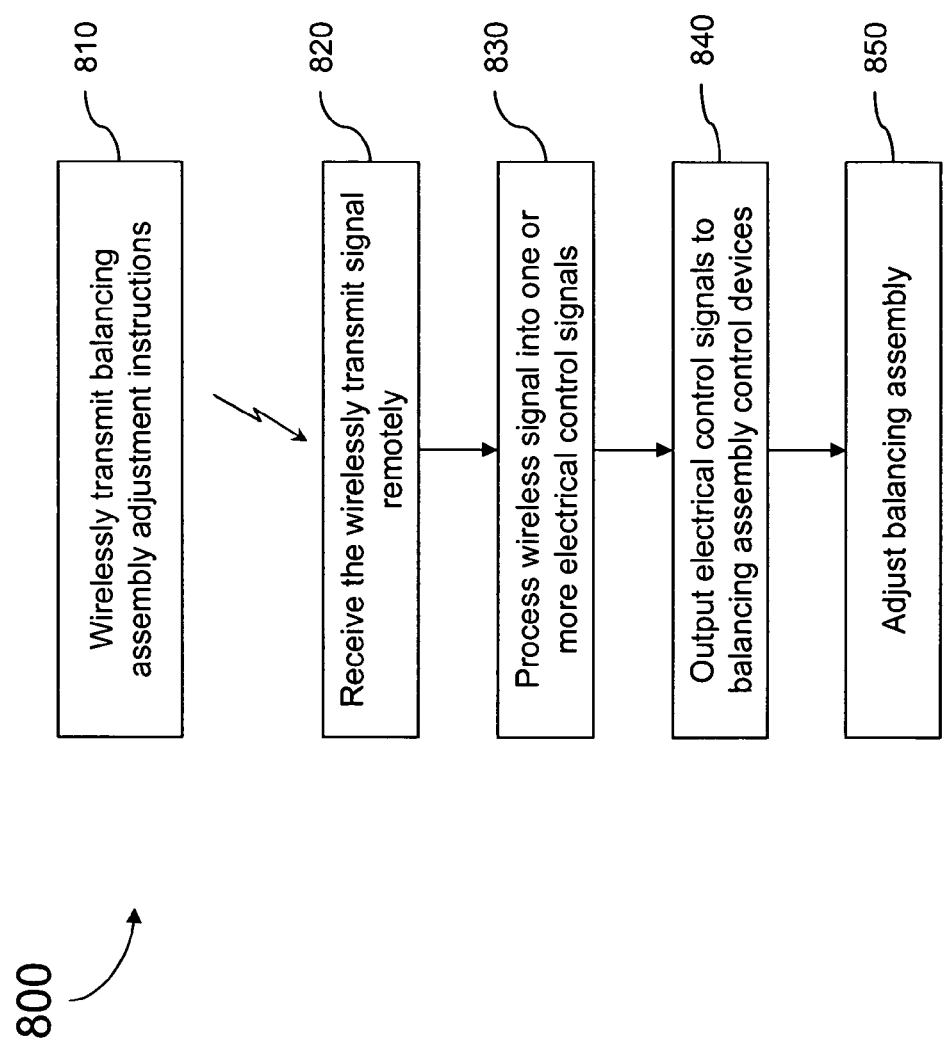
FIG. 8 is a flow chart of another method embodiment of the present invention.

In FIG. 8, a method for wirelessly communicating balancing assembly adjustment instructions 800 of an embodiment of the present invention is illustrated. The method starts by transmitting a signal representing balancing assembly adjustment instructions wirelessly (810). The signal is then received at an inertial sensor assembly (820). The signal is then processed into one or more electrical control signals (830). The one or more electrical control signals are outputted to one or more balancing assembly electrical control devices (840). The balancing assembly is then adjusted based on the one or more electrical control signals (850).

Figure 9:
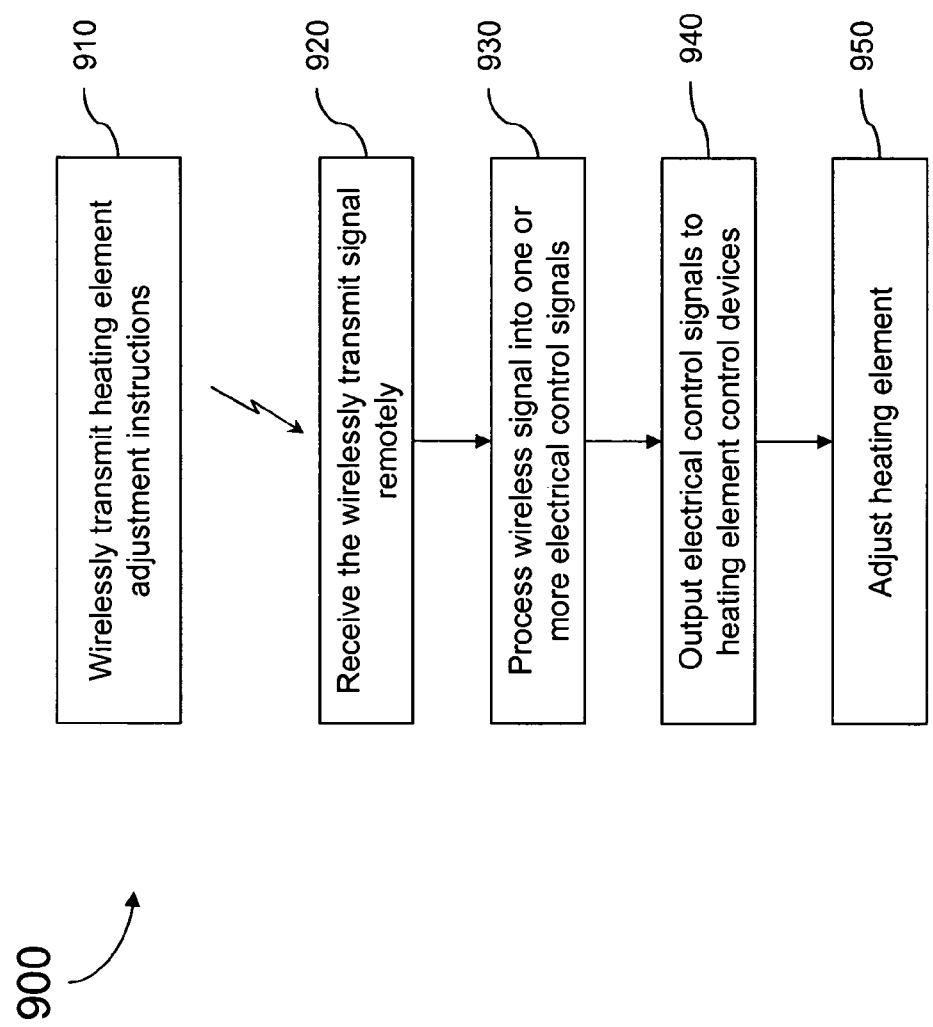
FIG. 9 is a flow chart of another method embodiment of the present invention.

In FIG. 9, a method for wirelessly communicating heating element adjustment instructions 900 of an embodiment of the present invention is illustrated. The method starts by transmitting a signal representing heating element adjustment instructions wirelessly (910). The signal is then received at an inertial sensor assembly (920). The signal is then processed into one or more electrical control signals (930). The one or more electrical control signals are outputted to one or more heating element control devices (940). The heating element is then adjusted based on the one or more electrical control signals (950).

Several means are available to implement the controller element of the current invention. These means include, but are not limited to, digital computer systems, programmable controllers, or field programmable gate arrays. Therefore other embodiments of the present invention are program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for wirelessly communicating inertial measurements, the method comprising:

sensing movement of a gas supported inertial sensor assembly from one or more instrumentation sensors sealed within the gas supported inertial sensor assembly;

transmitting a signal representing the sensed movement wirelessly;

receiving the signal at a location outside the gas supported inertial sensor assembly; and processing the signal into a data signal representing the sensed movement.

2. The method of claim 1, wherein the a gas supported inertial sensor assembly further has one or more balancing assembly control devices sealed within the gas supported inertial sensor assembly, the method further comprising:

transmitting a signal representing balancing assembly adjustment instructions wirelessly from a location outside the gas supported inertial sensor assembly;

receiving the signal within the gas supported inertial sensor assembly;

processing the signal into one or more electrical control signals;

outputting the one or more electrical control signals to one or more balancing assembly control devices; and adjusting one or more balancing assemblies based on the one or more electrical control signals.

3. The method of claim 1, wherein the a gas supported inertial sensor assembly further has one or more heating element control devices sealed within the gas supported inertial sensor assembly, the method further comprising:

transmitting a signal representing heating element adjustment instructions wirelessly from a location outside the gas supported inertial sensor assembly;

receiving the signal within the gas supported inertial sensor assembly;

processing the signal into one or more electrical control signals;

outputting the one or more electrical control signals to one or more heating element control devices; and adjusting the one ore more heating element based on the one or more electrical control signals.

4. A method for wirelessly communicating balancing assembly adjustment instructions, the method comprising:

transmitting a signal representing balancing assembly adjustment instructions wirelessly;

receiving the signal at an inertial sensor assembly;

processing the signal into one or more electrical control signals;

outputting the one or more electrical control signals to one or more balancing assembly electrical control devices; and adjusting the balancing assembly.

5. A method for wirelessly communicating heating element adjustment instructions, the method comprising:

transmitting a signal representing heating adjustment instructions wirelessly;

receiving the signal at an inertial sensor assembly;

processing the signal into one or more electrical control signals;

outputting the one or more electrical control signals to one or more heating element control devices; and adjusting the heating element.

6. A computer-readable medium having computer-executable instructions for performing a method for determining the movements of an inertial sensor assembly, the method comprising:

receiving a wirelessly transmitted signal representing movement of a gas supported inertial sensor assembly from one or more instrumentation sensors sealed within the gas supported inertial sensor assembly; and processing the wirelessly transmitted signal into a data signal representing the sensed movement.

7. The method of claim 6, further comprising:
visually displaying the data signal representing the sensed movement.

8. The method of claim 6, further comprising:
outputting the data signal representing the sensed movement to a flight control system.

9. The method of claim 6, wherein the inertial sensor assembly has one or more balancing assembly control devices sealed within the inertial sensor assembly, the method further comprising:

transmitting a signal representing balancing assembly adjustment instructions wirelessly from a location outside the inertial sensor assembly.

10. The method of claim 6, wherein the inertial sensor assembly has one or more heating element control devices sealed within the inertial sensor assembly, the method further comprising:

transmitting a signal representing heating element adjustment instructions wirelessly from a location outside the inertial sensor assembly.

* * * * *

UNITED STATES PATENT AND TRADEMARK OFFICE
CERTIFICATE OF CORRECTION

PATENT NO. : 7,366,613 B2
APPLICATION NO. : 11/004177
DATED : April 29, 2008
INVENTOR(S) : DuBois et al.

Page 1 of 1

It is certified that error appears in the above-identified patent and that said Letters Patent is hereby corrected as shown below:

At Claim 3, Column 11, line 39, replace "ore" with --or--

Signed and Sealed this

Fifth Day of August, 2008

JON W. DUDAS
*Director of the United States Patent and Trademark Office*